United States Patent
Hardy et al.

(10) Patent No.: US 7,664,851 B2
(45) Date of Patent: Feb. 16, 2010

(54) SYSTEMS, METHODS, AND COMPUTER PRODUCTS FOR AN EVENT-DRIVEN NETWORK SERVICE SWITCHING UTILITY

(75) Inventors: Michael Hardy, Lawrenceville, GA (US); Eric Aslaksen, Atlanta, GA (US); Richard Voyentzie, Smyrna, GA (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 451 days.

(21) Appl. No.: 11/653,550

(22) Filed: Jan. 16, 2007

(65) Prior Publication Data

US 2008/0016197 A1    Jan. 17, 2008

Related U.S. Application Data

(60) Provisional application No. 60/830,812, filed on Jul. 14, 2006.

(51) Int. Cl.
*G06F 15/173*    (2006.01)

(52) U.S. Cl. .......... 709/224; 709/227; 709/223; 709/219; 714/5; 370/412

(58) Field of Classification Search ........... 709/224, 709/227, 223, 219; 714/5; 370/412
See application file for complete search history.

(56) References Cited

U.S. PATENT DOCUMENTS

| 6,658,469 | B1 * | 12/2003 | Massa et al. ............ 709/224 |
| 2005/0089054 | A1 * | 4/2005 | Ciancaglini et al. ....... 370/412 |
| 2005/0278565 | A1 * | 12/2005 | Frattura et al. ............ 714/5 |
| 2007/0162595 | A1 * | 7/2007 | Samprathi ............... 709/224 |

\* cited by examiner

*Primary Examiner*—Tammy T Nguyen
(74) *Attorney, Agent, or Firm*—Cantor Colburn LLP (57) ABSTRACT

Systems, methods, and computer products for event driven and timer-driven network service switching. Exemplary embodiments include a network-switching method, including establishing a connection with a network via a network adapter, monitoring the adapter for a connection status with the network, generating a first block of network traffic over the network adapter and blocking a second block of network traffic over the network adapter.

16 Claims, 7 Drawing Sheets

SYSTEMS, METHODS, AND COMPUTER PRODUCTS FOR AN EVENT-DRIVEN NETWORK SERVICE SWITCHING UTILITY

This application claims priority to U.S. Provisional Application Ser. No. 60/830,812, entitled METHODS, DEVICES, AND COMPUTER PROGRAM PRODUCTS FOR CONTROLLING WIRELESS CONNECTION ACCESS, filed on Jul. 14, 2006, the contents of which are incorporated by reference herein in its entirety.

BACKGROUND

The present invention relates generally to network services, and more particularly, to systems, methods, and computer products for network switching, particularly for data transmission over network adapters.

As wired and wireless networking solutions become more prevalent and systems' bandwidth requirements continue to grow, the ability to discriminate which bandwidth-consuming services, such as Windows® services, are required to run over given connection is also becoming a greater concern. Typically, most services tend to be "chatty", that is, the services tend to consume network bandwidth for non-essential communications, thus accruing unnecessary bandwidth usage. When considered in use with a limited data plan or in striving to get there from a higher-cost unlimited bandwidth data plan, the resulting additional network traffic can be costly. As adoption of networked solutions continues to grow and businesses seek to keep costs down and system performance maximized, the ability to manage costs and still keep devices manageable is needed.

BRIEF SUMMARY

Exemplary embodiments include a network-switching method, including establishing a connection with a network via a network adapter, monitoring the adapter for a connection status with the network, and blocking or allowing network traffic as predetermined by tool configuration.

Additional exemplary embodiments include a network-switching apparatus, including a network access device connected to a network, the network access device having a memory and a storage medium, a network adapter coupled to the network access device, a first process residing in at least one of the memory and the storage medium, the first process having instructions to access and generate network traffic over the network adapter, a second process residing in at least one of the memory and the storage medium, the second process having instructions to monitor the network adapter for a connect and disconnect status, enable the first process in response to the network adapter being disabled and disable the first process in response to the network adapter being enabled.

Further exemplary embodiments include a computer program product for providing network-switching services, the computer program product including instructions for implementing a method, including monitoring a network adapter for a connect and disconnect status, enabling a first process in response to the network adapter being disabled and disabling the first process in response to the network adapter being enabled.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments include systems, methods and computer products for network service switching for applications requiring network access that tend to use network bandwidth when not in required use. In general, the ability to prevent predefined services from being active while pre-defined network adapters are also active in predefined combinations is provided. As such, if there are several applications that normally require adapter time or network bandwidth, but are not currently in need of required adapter time or network bandwidth, they are blocked from accessing the adapter for unnecessary operations. For example, on a personal computer (PC) certain services do not run when certain conditions exist with associated network adapters.

It is therefore appreciated that issues associated with network connectivity are addressed. Although the embodiments described herein can handle a specific switching scenario, they can also provide a general switching service for multiple applications over a single adapter. In exemplary implementation, a system can determine when a specific adapter has established a network connection, and then turn off services that may communicate across this connection. As such a device can be filtered based on network connection speeds and costs.

Figure 1:
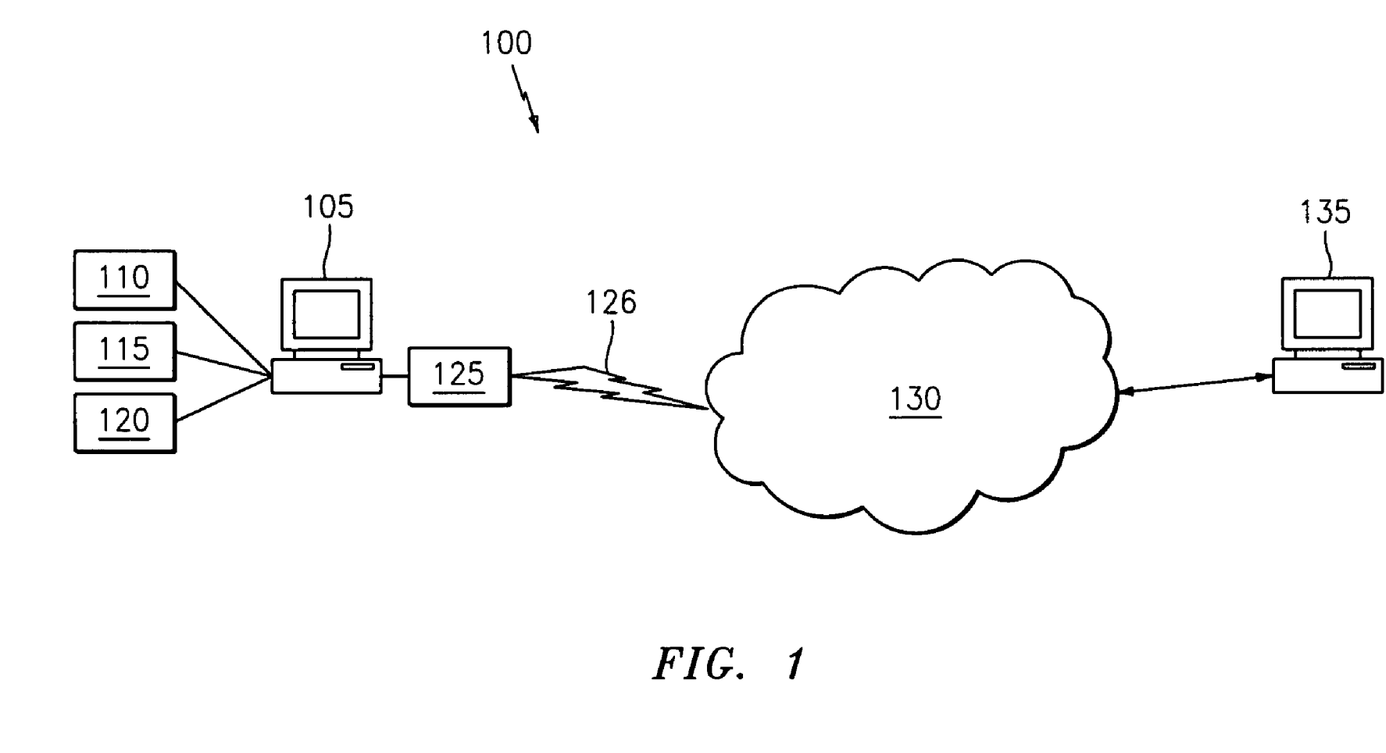
FIG. 1 is a block diagram illustrating a system in which network switching services may be implemented in accordance with exemplary embodiments.

FIG. 1 is a block diagram illustrating a system 100 in which network-switching services may be implemented in accordance with exemplary embodiments. System 100 can include a network access device 105, which is can be a general purpose computer, which includes a processor executing computer program code stored on a storage medium in order to perform the processes described herein. Network access device 105 can also be any type of network-enabled device that is capable of presenting programming content to viewers. In exemplary embodiments, network access device 105 can be a PC, a laptop computer, a portable computing device (e.g., personal digital assistant), a digital music player (e.g., MP3 player), cellular telephone (e.g., a 3G cell phone), etc. Network access device 105 further can include a network adapter 125 for connectivity to a network 130, via a network connection 126 (i.e., wired or wireless as discussed below). In accordance with exemplary embodiments, network 130 is an IP-based network that transmits content to and from network access device 105 via a broadband connection. In exemplary embodiments, network 130 can be a public network such as the Internet or a managed IP network administered by a service provider, which can control bandwidth and quality of application flow. As discussed, network 130 may be implemented in a wired fashion, e.g. Ethernet, copper, etc, or in a wireless fashion, e.g., using wireless protocols and technologies, such as GPRS, WiFi, WiMax, etc. Although exemplary embodiments of the systems and methods described herein relate to wireless adapters, it is understood that in other exemplary embodiments, wired applications are also contemplated. System 100 can further include an additional network access device 135 in communication with network 130, which can be in further communication with network access device 105.

System 100 further includes applications which can reside in a local memory of network access device 105, a storage medium of network access device 105 or a combination thereof. A first application 110 can be a software application requiring access to network adapter 125. A second application 115 can be a software application also requiring access to network adapter 125. As discussed above, network access device 105 may implement a network access service that requires a "pay by the byte" or "all you can eat" solution. Applications 110, 115 may periodically access network 130 for various reasons that can create network traffic or "chatter".

"Chatter" can be defined as the network traffic generated in the background by a system service or function. "Background" traffic like this is usually, but not always, the result of a service that polls its service-hosting server(s) for a check-in looking for any additional tasks to perform or can be "background" data between an application and its hosting server. In these cases, this "chatter" is considered non-critical to current end user operations, but may be critical to the long term functioning of that service or application and just needs to occur at a later time.

However, one or both of applications 110, 115 may require legitimate access to network 130 via network adapter 125. Legitimate access refers to an operation in which a user desires to have a given service or function communicate over the network and is willing to pay for the bytes transmitted in the case of a "pay by the byte" service or assume the bandwidth consumption in general. As such, according to exemplary embodiments, a third event-driven network service switching utility ("switching") application 120 monitors network adapter 125 and the traffic that is transmitted via network adapter 125. In accordance with exemplary embodiments, switching application 120 can turn off an application that is not in legitimate use when an application that is in legitimate use is accessing network adapter 125. For example, first application 110 may be an "SMS Agent Host" service that allows a service, such as the Microsoft Systems Management Service, to provide configuration management services and software updates to devices on network 130 such as additional network access device 135. These services are preconfigured and therefore may generate network traffic that is undesired at a particular time, such as when an application that is in legitimate use is accessing the network adapter 125. However, network access is not always required, but the SMS Agent Host may constantly try to access network adapter 125 and therefore generate network traffic across the wireless connection that was paid for by the amount of bytes used, but not required. SMS Agent Host therefore has a predetermined network access that activates when not always required by the user. Second application 115 can be any other application in which the user desired to access network 130, such as a browser. Switching application 120 therefore determines when the predetermined network access by SMS Agent Host is connected and stops the service when not required or desired by the user, such as when the second application 115 is accessing the network adapter 125. When the user is finished with the network connection using second application 115, and disconnects from the network 130, switching application 120 may automatically sense the adapter disconnect and start the preconfigured service of the SMS Agent Host without unnecessarily using the network adapter 125.

According to exemplary embodiments, the switching application 120 is an event driven network service switching utility application that is triggered by network interface specific events, such as the connect or disconnect of a network interface such as wireless adapter 125. In other exemplary embodiments, switching application 120 can check for connect and disconnect events on a periodic basis, based on a timer.

The switching application 120 and related network switching services may be implemented as a single program executing on the network access device 105, or may be separate physical components that interact via, e.g., an application programming interface or other technique.

Figure 2:
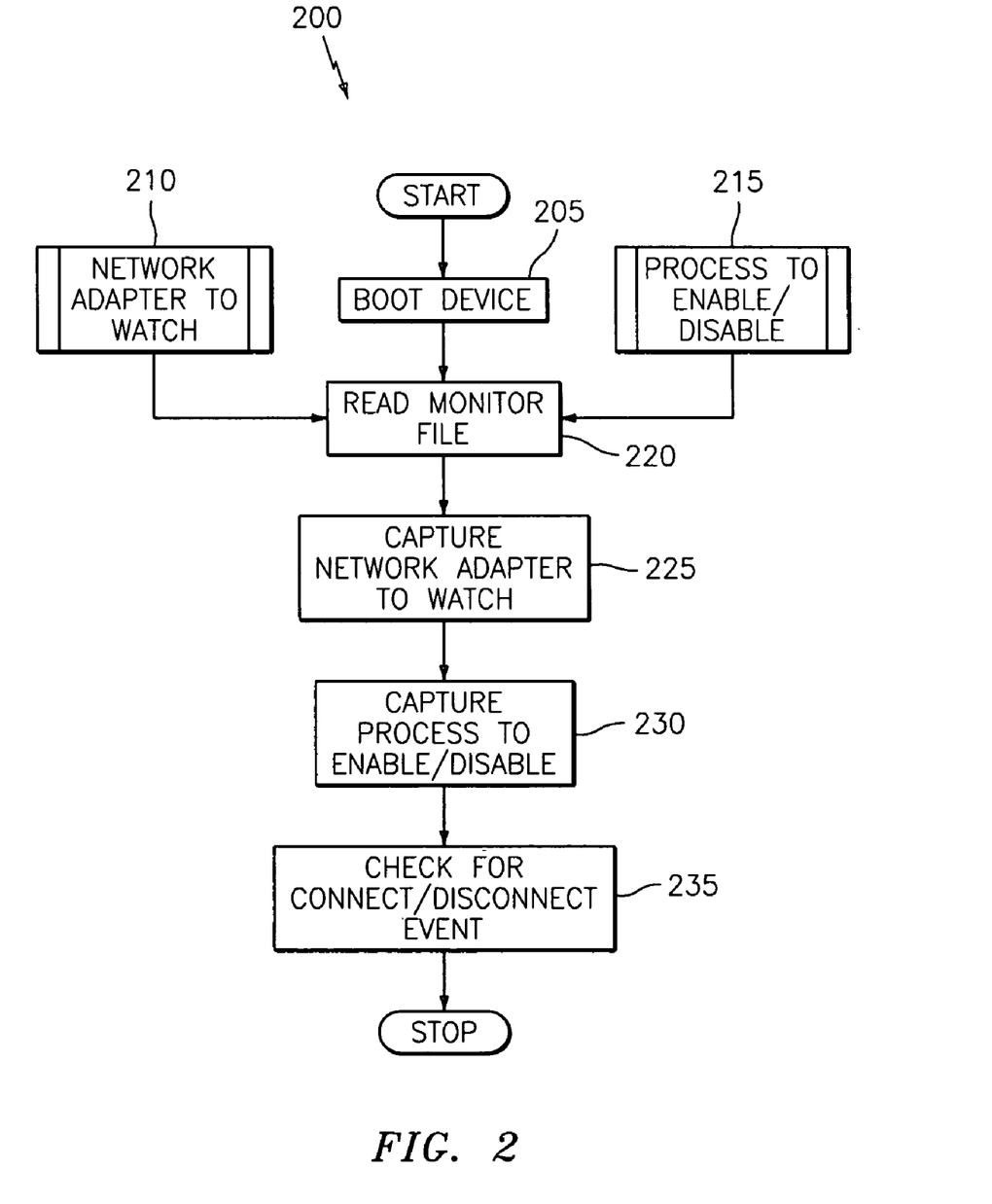
FIG. 2 is a flow diagram describing a process for implementing network switching services in exemplary embodiments.

FIG. 2 is a flow diagram describing a process 200 for implementing network-switching services in exemplary embodiments. When the network access device 105 is booted at step 205, configuration files provide information related to the network adapters to watch, preconfigured at step 210. Switching application 120 that is used as a process to enable and disable other applications associated with the network access device 105, such as the first and second applications 110, 115, is launched at step 215. Steps 210, 215 are part of the read monitor file at step 220. In an exemplary implementation, the read monitor file at step 220 is a monitor.xml file, which can be in the following form:

```
<?xml version="1.0"?>
<MonitorTool DataVersion="9.7.2005">
<NetworkAdapter>
    <Adapter ProductName="Sony Ericsson Wireless WAN Adapter">
    <ApplicationApplicationID="SMS"ApplicationProcess=
    "CcmExec" />
    </Adapter>
</NetworkAdapter>
</MonitorTool>
```

In the foregoing example, switching application 120 is developed using the .Net 1.1 framework. Configuration options are maintained via a standard XML file. The XML file contains two configurable sections. The first section contains the name of the network adapter that triggers connectivity events, as discussed above. The second section contains the name of the services that are stopped and started based on the connectivity event. It is understood that the file type is shown for illustrative purposes and it is further understood that other file forms are contemplated.

Referring still to FIG. 2, the monitor file allows network access device 105 to capture the network adapters to watch at step 225, and to capture the process to enable and disable the network adapter at step 230. As discussed, in an exemplary embodiment, the process to enable and disable is switching application 120. Once process 200 has run through the aforementioned initialization, switching application 120 can check for connect/disconnect events at step 235 either on an event-driven basis or on a timed basis as discussed above. Further details of the monitoring process at step 235 are now described.

Figure 3:
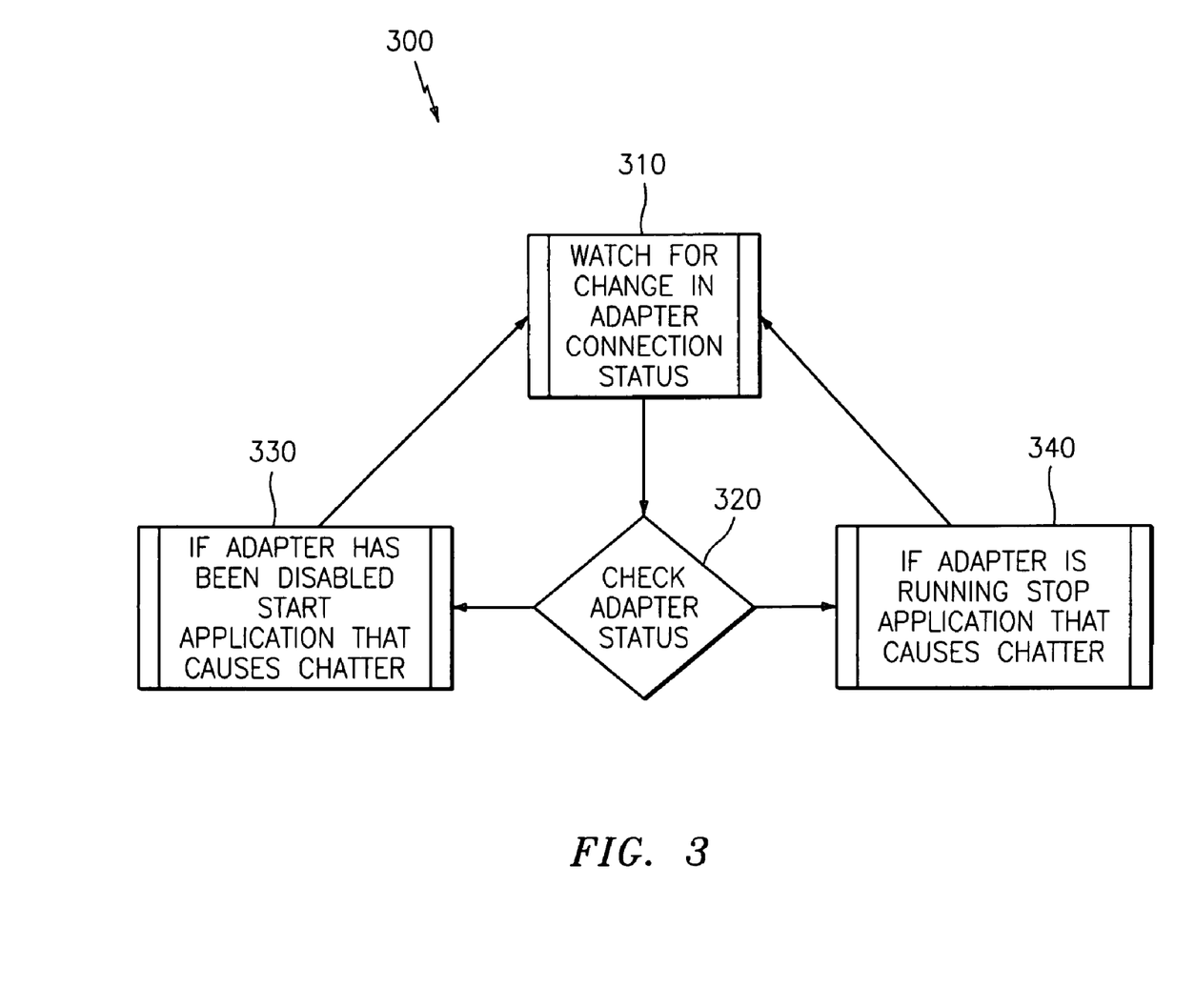
FIG. 3 is a flow diagram describing processes for implementing network switching services in exemplary embodiments.

FIG. 3 is a flow diagram describing a process 300 for implementing network switching and monitoring services in exemplary embodiments. In exemplary embodiments, switching application 120 monitors and watches for changes in the network adapter 125 status at step 310. At step 320, switching application 120 checks the network adapter status. If the switching application 120 determines that the network adapter 125 is running and being accessed by an application that would cause undesired chatter on the network adapter 125 and that the undesired application access is not required and/or that an application that a user desires to access the network adapter 125 is accessing the network adapter, the switching application 120 stops the application that would cause undesired chatter at step 340. Similarly, if the network adapter 125 has been disabled (i.e., is not being accessed), the switching application 120 may start the application that would cause undesired chatter on the network adapter 125 at step 330. Process 300 is an ongoing monitoring process via switching application 120 so long as network access device 105 is powered on and using network adapter 125, or until switching application 120 has been disabled.

Figure 4:
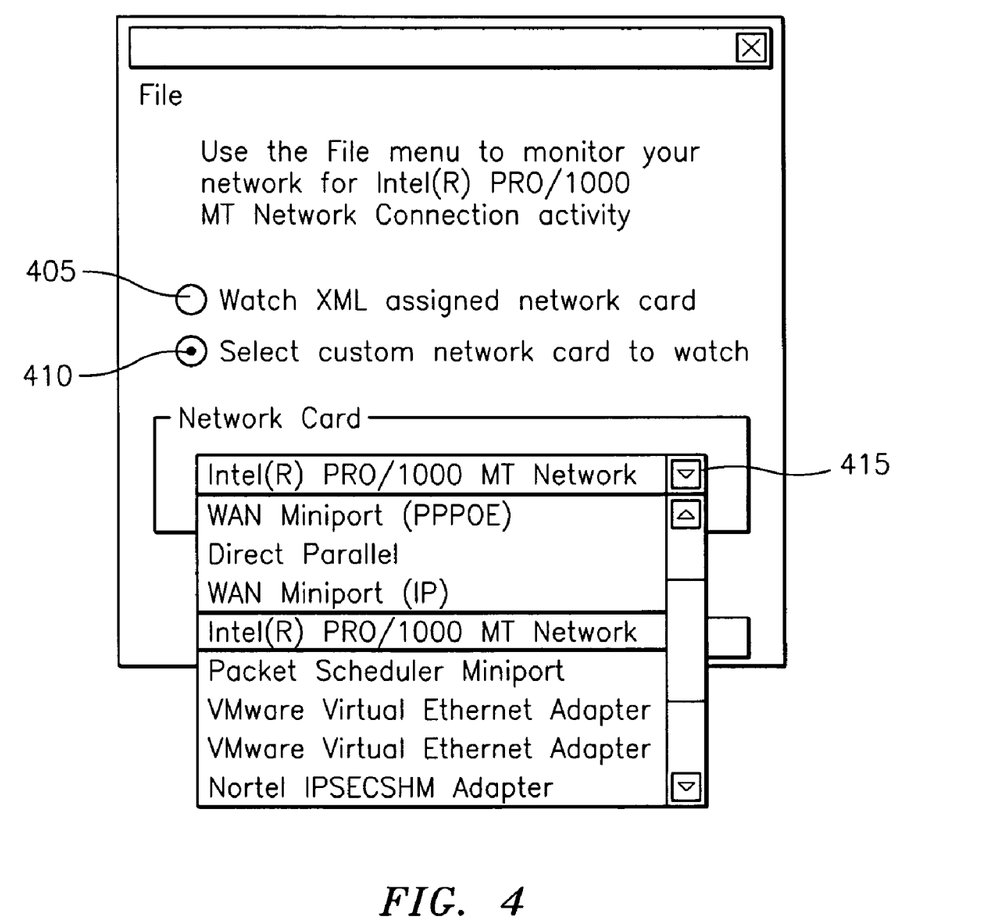
FIG. 4 depicts an exemplary user interface for implementing network switching services in exemplary embodiments.

FIG. 4 depicts an exemplary user interface for implementing network switching services in exemplary embodiments. The interface can include a selection field 405 to watch the XML assigned to a network adapter. The interface can further include a selection field 410 to select a custom card to watch. The interface can further include a selection filed 415 having, for example, a pull-down menu in which various network cards to watch can be selected.

Figure 5A:
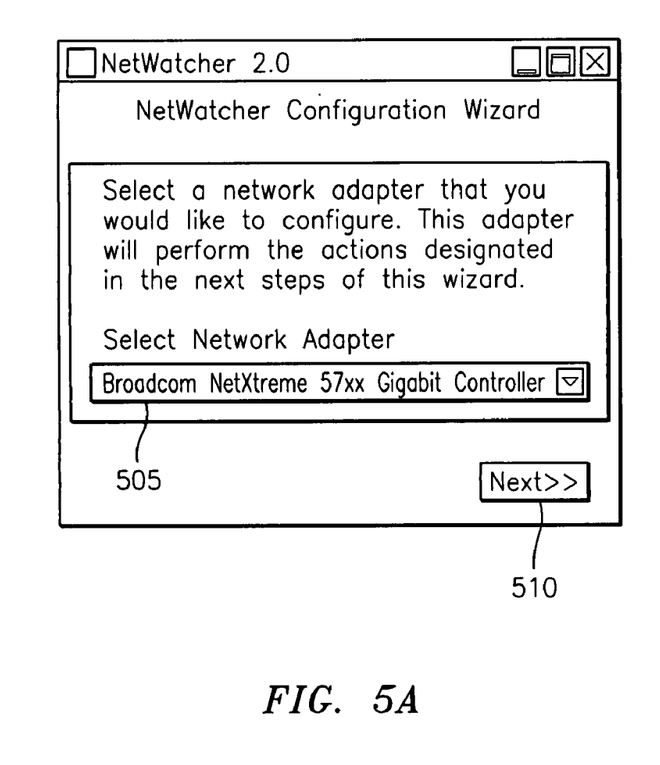
FIGS. 5A-5E depict exemplary user interfaces for implementing network switching services in exemplary embodiments.

FIGS. 5A-5E depict exemplary user interfaces for implementing network switching services in exemplary embodiments. The user interfaces are an alternate embodiment to the exemplary embodiment illustrated in FIG. 4. Referring to FIG. 5A, the user interface includes a selection field 505 that can include, for example, a pull-down menu from which a user can select an adapter on their computing device, such as a PC, that performs the network functions as discussed above. The user interface can further include a navigational button 510 to move to the next interface screen.

Figure 5B:
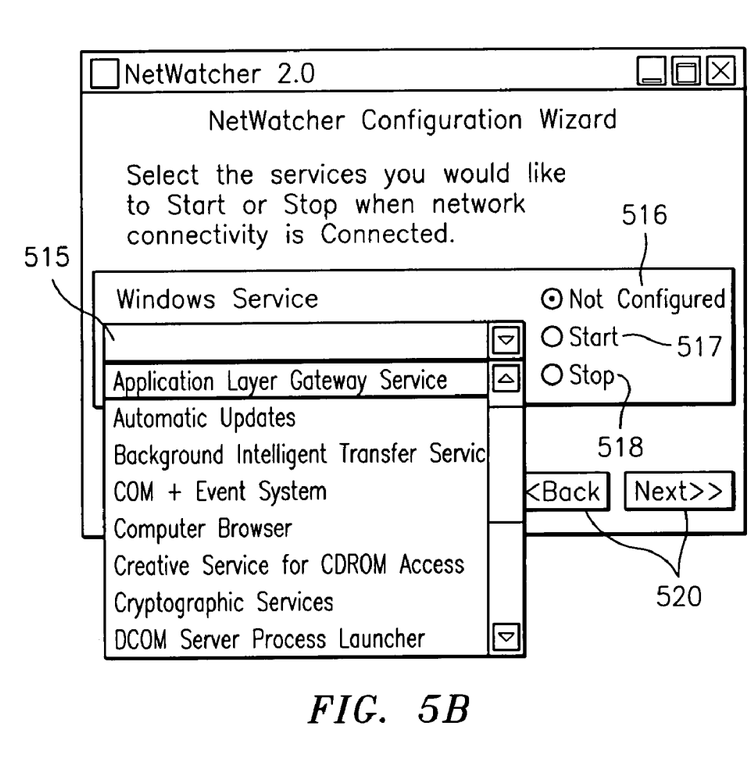

Referring to FIG. 5B, the user interface further includes a selection field 515, which can include a pull-down menu, to select a network service, such as a Windows® service on a PC, that starts/stops when the network adapter is connected to a network. The user interface can further include a selection field 516 to indicate that the selected service is not configured, a selection field 517 to indicate that the selected service starts when the adapter connects to a network, and a selection field 518 to indicate that the service stops when the adapter connects to a network. The user interface can further include navigational buttons 520 to move to the next interface screen or to the prior interface screen.

Figure 5C:
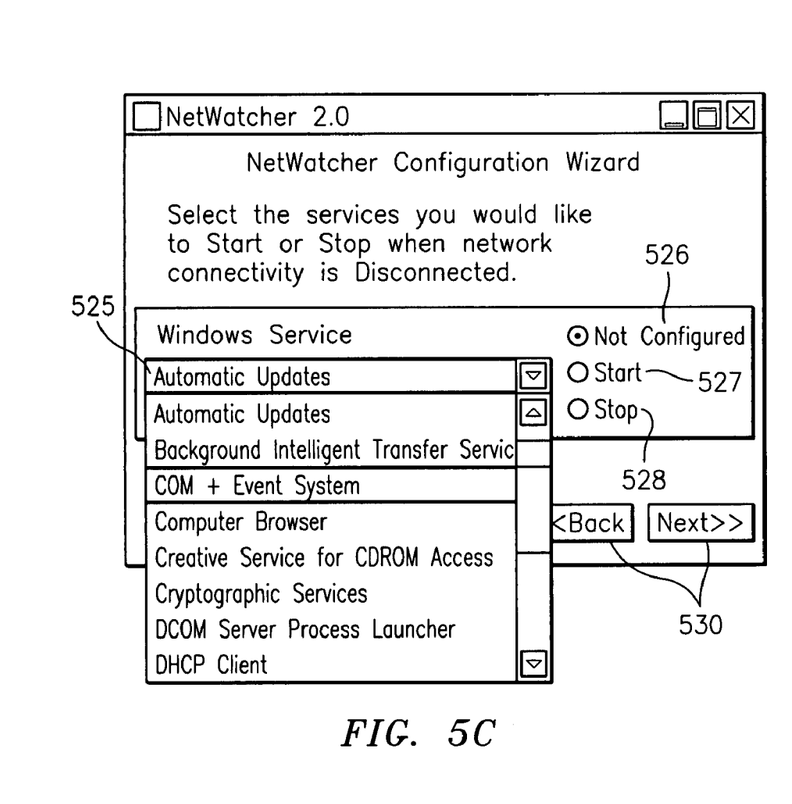

Referring to FIG. 5C, the user interface further includes a selection field 525, which can include a pull-down menu, to select a network service, such as a Windows® service on a PC, that starts/stops when the network adapter is disconnected from a network. The user interface can further include a selection field 526 to indicate that the selected service is not configured, a selection field 527 to indicate that the selected service starts when the adapter disconnects from a network, and a selection field 528 to indicate that the service stops when the adapter disconnects from a network. The user interface can further include navigational buttons 530 to move to the next interface screen or to the prior interface screen.

Figure 5D:
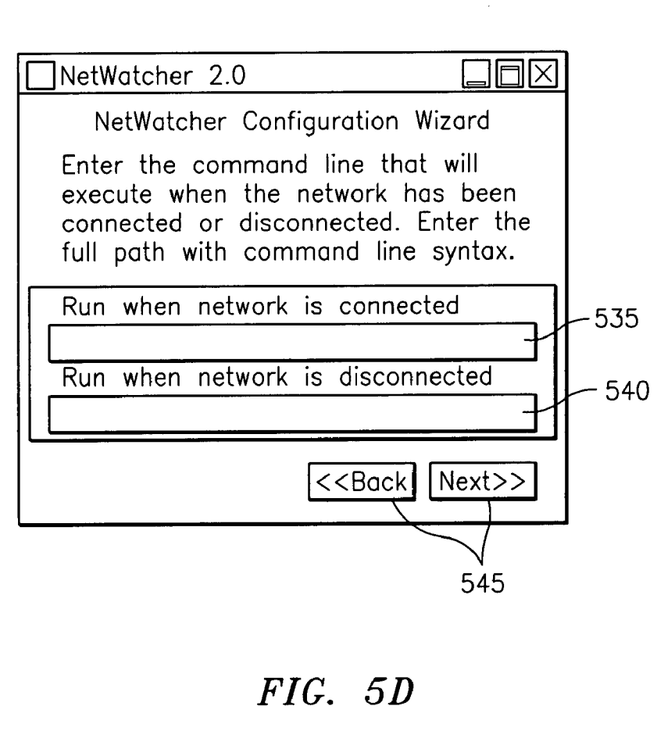

Referring to FIG. 5D, the user interface can further include a selection field 535, into which a user run any command line value when the network adapter has been connected to the network. Similarly, the user interface can further include a selection field 540, into which a user run any command line value when the network adapter has been disconnected from the network. The user interface can further include navigational buttons 545 to move to the next interface screen or to the prior interface screen.

Figure 5E:
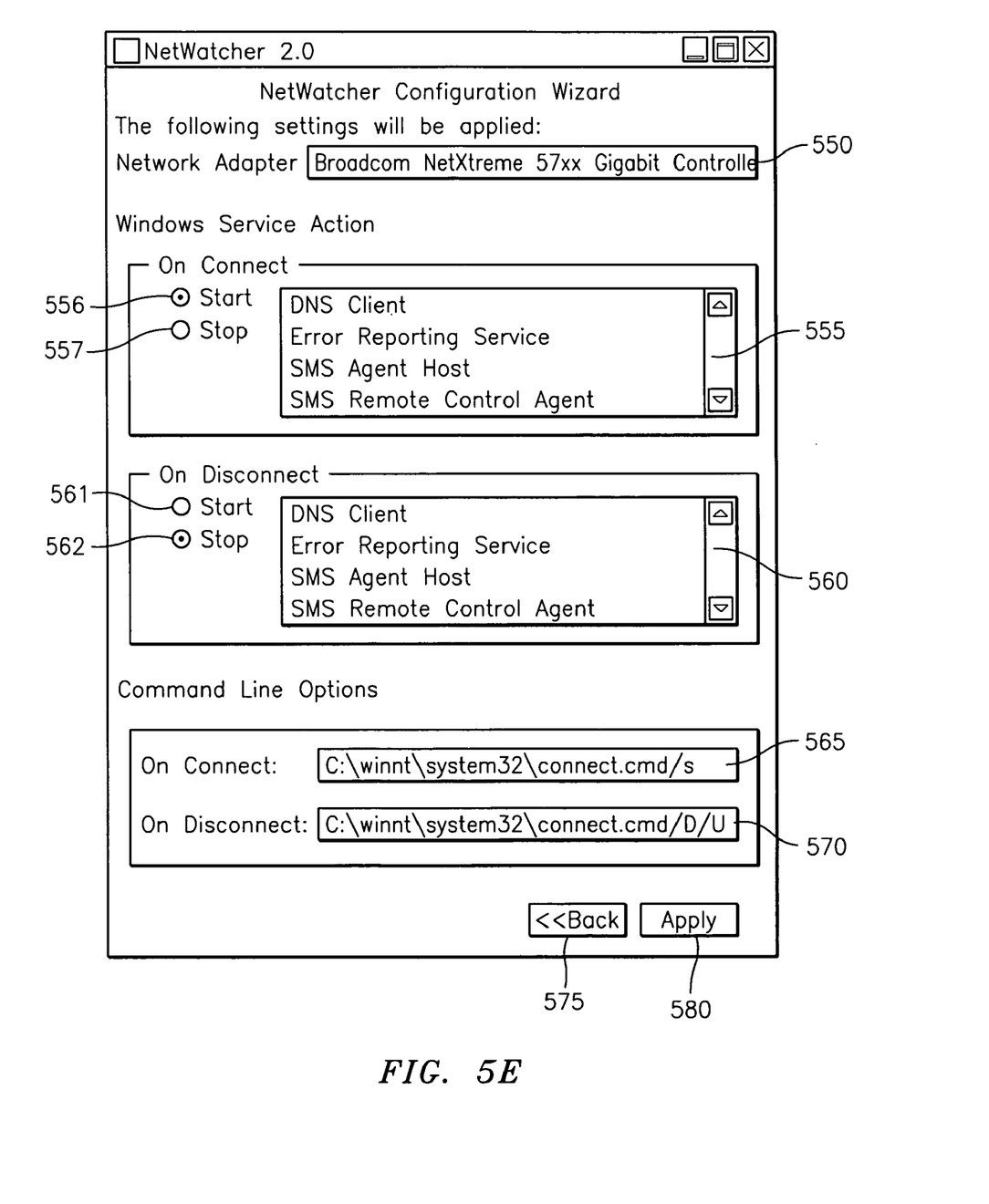

Referring to FIG. 5E, the user interface further includes selection fields so that a user can confirm the settings made in the prior interface screens illustrated in FIGS. 5A-5D and apply the settings to the selected network adapter. The user interface can include a data field 550 that displays the selected network adapter. The user interface can further include a selection field 555 that can be scrollable, from which service actions can be selected. The user interface can further include a selection field 556 to indicate that the service starts when the network adapter connects to a network, and a selection field 557 to indicate that the service stops when the network adapter connects to a network. Similarly, the user interface can further include a selection field 560 that can be scrollable, from which service actions can be selected. The user interface can further include a selection field 561 to indicate that the service starts when the network adapter disconnects from a network, and a selection field 562 to indicate that the service stops when the network adapter disconnects from a network. The user interface can further include a data field 565 that displays the selected command line value that runs when the network adapter connects to a network, and a data field 570 that displays the selected command line value when the network adapter disconnects from a network. The user interface can further include a navigational button 575 to move to the prior interface screen, and a button 580 to apply the settings to the selected network adapter.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A network-switching method, comprising:
    establishing a connection with a network via a network adapter of a device;
    monitoring the adapter for a connection status with the network;
    generating a first block of network traffic over the network adapter of the device a first application being on the device generates the first block of network traffic; and
    in response to the first block of network traffic communicating over the network adapter, blocking a second block of network traffic over the network adapter of the device from communicating over the network, a second application being on the device generates the second block of network traffic;
    wherein when a third application on the device detects the first block of network traffic communicating over the network adapter, the third application blocks the second block of network traffic from communicating over the network adapter of the device;
    wherein the first block of network traffic is user initiated; and
    wherein the second block of network traffic is not user initiated;
        Wherein blocking the second block of the network traffic over the network adapter comprises disabling a preconfigured computer service in response to establishing the connection with the network via the network adapter, the preconfigured computer service generating the second block of network traffic; and
        enabling the preconfigured computer service in response to the connection with the network via the network adapter.

2. The method as claimed in claim 1 wherein generating a first block of network traffic over the network adapter comprises performing a first network operation that generates the first block of network traffic, and wherein blocking a second block of network traffic over the network adapter comprises disabling a preconfigured computer service that generates the second block of network traffic that is unrelated to the first network operation, in response to performing the first network operation.

3. The method as claimed in claim 2 wherein blocking a second block of network traffic over the network adapter farther comprises disabling the network in response to a completion of the first network operation.

4. The method as claimed in claim 3 further comprising enabling the preconfigured computer service in response to disabling the network adapter upon the completion of the first network operation.

5. The method as claimed in claim 1 wherein monitoring the adapter for a connection status with the network comprises periodically checking the network connection to determine if the network connection should be disabled in response to the completion of the generation of the first block of network traffic.

6. The method as claimed in claim 1 wherein monitoring the adapter for a connection status with the network comprises periodically checking the network connection to determine if the network connection should be disabled in response to the enabling of a preconfigured computer service that generates the second block of network traffic.

7. The method as claimed in claim 1 wherein monitoring the adapter for a connection status with the network further comprises enabling the network connection in response to the generation of the first block of network traffic.

8. The method as claimed in claim 1 wherein monitoring the adapter for a connection status with the network further comprises disabling the network connection in response to a preconfigured computer service being enabled, thereby generating the second block of network traffic.

9. A device, comprising:
    memory for storing a program for providing reverse auction services; and
    a processor, functionally coupled to the memory, the processor being responsive to computer-executable instructions contained in the program and operative for;
    establishing a connection with a network via a network adapter of a device;
    monitoring the adapter for a connection status with the network;
    generating a first block of network traffic over the network adapter of the device, a first application being on the device generates the first block of network traffic; and
    in response to the first block of network traffic communication over the network adapter, blocking a second block of network traffic over the network adapter of the device from communicating over the network, a second application being on the device generates the second block of network traffic;
    wherein when a third application on the device detects the first block of network traffic communicating over the network adapter, the third application blocks the second block of network traffic from communicating over the network adapter of the device;
    wherein the first block of network traffic is user initiated;
    wherein the second block of network traffic is not user initiated; and
    wherein blocking the second block of network traffic over the network adapter comprises disabling a preconfigured computer service in response to establishing the connection with the network via the network adapter, the preconfigured computer service generating the second block of network traffic; and
    enabling the preconfigured computer service in response to disabling the connection with the network via the network adapter.

10. The device as claimed in claim 9 wherein the third application periodically enables the network adapter.

11. The device as claimed in claim 10 wherein the third application disables the second application in response to the third application enabling the network adapter.

12. The apparatus as claimed in claim 10 wherein the third application periodically disables the network adapter.

13. The apparatus as claimed in claim 9 wherein the network adapter is a wireless adapter in communication with a network.

14. A computer program product embedded in a computer-readable storage medium for providing network-switching services, the computer program product including instructions for implementing a method, comprising:
    establishing a connection with a network via a network adapter of a device;
    monitoring the adapter for a connection status with the network;

generating a first block of network traffic over the network adapter of the device a first application being on the device generates the first block of network traffic; and in response to the first block of network traffic communicating over the network adapter, blocking a second block of network traffic over the network adapter of the device from communicating over the network, a second application being on the device generates the second block of network traffic;

wherein when a third application on the device detects the first block of network traffic communicating over the network adapter, the third application blocks the second block of network traffic from communicating over the network adapter of the device;

wherein the first block of network traffic is user initiated; and wherein the second block of network traffic is not user initiated;

Wherein blocking the second block of the network traffic over the network adapter comprises disabling a preconfigured computer service in response to establishing the connection with the network via the network adapter, the preconfigured computer service generating the second block of network traffic; and enabling the preconfigured computer service in response to the connection with the network via the network adapter.

15. The computer readable medium as claimed in claim 14 wherein the network adapter is periodically enabled by a second process.

16. The computer readable medium as claimed in claim 15 wherein the network adapter is periodically disabled by the second process.

* * * * *